United States Patent [19]

Linkner, Jr. et al.

[11] Patent Number: 5,439,279
[45] Date of Patent: Aug. 8, 1995

[54] VEHICULAR ANTI-LOCK BRAKE SYSTEM HYDRAULIC CONTROL UNIT

[75] Inventors: Herbert L. Linkner, Jr., Dexter; Wendell D. Tackett, Ann Arbor, both of Mich.

[73] Assignee: Kelsey-Hayes Company, Romulus, Mich.

[21] Appl. No.: 198,365

[22] Filed: Feb. 18, 1994

[51] Int. Cl.6 ............................................. B60T 8/36
[52] U.S. Cl. ........................... 303/119.2; 137/454.2; 251/129.15
[58] Field of Search ................ 303/119.1, 119.2, 84.2; 137/454.2; 251/129.02, 129.15

[56] References Cited

U.S. PATENT DOCUMENTS

| | | | |
|---|---|---|---|
| 4,592,533 | 6/1986 | Guglielmi et al. | 251/129.15 |
| 4,828,335 | 5/1989 | Fuller et al. | 303/100 |
| 4,884,782 | 12/1989 | Hensley et al. | 251/129.15 |
| 4,987,923 | 1/1991 | Tackett | 303/119.2 X |
| 5,167,442 | 12/1992 | Alaze et al. | 303/113.2 |
| 5,267,785 | 12/1993 | Maisch | 303/119.2 |
| 5,333,946 | 8/1994 | Goosens et al. | 303/119.2 |

*Primary Examiner*—Josie A. Ballato
*Attorney, Agent, or Firm*—Brooks & Kushman

[57] ABSTRACT

A vehicle anti-lock brake system control unit having a control valve for a housing with a control valve bore therein. The control valve includes a sleeve with a moveable armature, and a coil surrounding the sleeve for moving the armature. The control valve also includes a valve body having an outer end attached to the sleeve and an inner end seated within the control valve bore of the housing. The valve body has an outer diameter no greater than the outer diameter of the coil such that minimum spacing between multiple control valves in the control unit is not limited by the outer diameter of the valve body.

15 Claims, 2 Drawing Sheets

VEHICULAR ANTI-LOCK BRAKE SYSTEM HYDRAULIC CONTROL UNIT

TECHNICAL FIELD

This invention relates to anti-lock brake system hydraulic control units, particularly for vehicular applications, and more particularly concerning the design of solenoid actuated valve units and the manner in which they are assembled to the hydraulic control unit.

BACKGROUND ART

Many of the automobiles being produced today are equipped with a hydraulic brake system including an anti-lock brake subsystem for assuring that the vehicle wheels do not lock up during sudden applications of the brake. The anti-lock brake system (ABS) is considered by many to be the most significant improvement in vehicle safety within the last decade and it is presently being offered as standard equipment in many vehicles.

Most types of ABS include a singular hydraulic control unit, usually in the form of an aluminum block, in which there is incorporated all of the componentry necessary to provide the anti-lock braking function to the braking system. This includes solenoid actuated isolation valves for isolating a particular wheel brake from braking force exerted through the brake pedal and master cylinder. It also includes solenoid actuated hold-/dump valves which are opened to relieve braking pressure at each of the wheel brakes thereby allowing the brake to relax its hold on the wheel. It further includes several low pressure accumulators and a pump for providing supplemental brake pressure to the wheels during the period of controlled braking.

All of this componentry is located in a single control unit, which is typically an aluminum block bored as required to receive the components and to provide fluid communication between the valves, accumulators and pump to complete the hydraulic circuitry. Consequently, the control unit can be of considerable size. For weight reasons, and perhaps more importantly for packaging reasons, it is desirable to maintain this size to an absolute minimum. Heretofore, a substantial amount of space has been required for the block because of the manner in which the solenoid actuated isolation valves and hold/dump valves are secured to the block as well as the manner in which the solenoid part of the valves mates with the electrical control portion of the control unit.

For example, as shown in U.S. Pat. No. 4,828,335, assigned to the assignee of the present invention, each of the isolation valves, dump valves, and accumulators are provided with an externally threaded portion for cooperation with the internally threaded bores of the control unit. For assistance in threading the components into the control unit, the isolation valves, dump valves, and accumulators each include a head having a radially enlarged flange shaped to receive a socket wrench or the like. Thus, the spacing of one valve from the other must be sufficient to accommodate the radial extent of the flange and reception of the socket wrench for the valve's installation into the control unit. This in turn increases the surface area required for the wall of the control unit from which the valves extend, and consequently the overall size of the control unit is increased.

Another factor contributing to the size of the control unit is the fact that the steel casing adapted to slide over the solenoid sleeve and associated coil has heretofore been constructed to be secured to the valve body prior to its installation in the control unit and prior to the electrical control module being fitted over the solenoid sleeves as part of the final assembly process. As shown in the above-referenced U.S. Patent, the casing can be crimped to the valve body portion. It is also known to eliminate the crimping operation and allow the casing to be slip fit over the outer body portion of the valve, either singly or as a part of the electrical control module, since in either case the casing will be in physical contact with the flux ring portion of the valve body.

It is also known to eliminate the socket wrench driving construction of the valve body head to include two diametrically opposed pin holes on the outboard side of the flux ring portion of the valve body thereby allowing the use of a spanner wrench to drive the threaded valve body home within the control unit.

SUMMARY OF THE INVENTION

The present invention contemplates constructing a control valve for a vehicle anti-lock brake control unit in such a manner that the control valve can be installed in the control unit occupying a minimum surface area on the wall of the control unit from which it extends thereby minimizing the overall size of the control unit.

The invention further contemplates a control valve construction as above described wherein the valve body is provided with a retaining flange to be received within a control valve bore within the control unit, the retaining flange facilitating retaining the valve body in the bore by means of a circular snap ring.

The invention further contemplates a control valve as above described wherein the flux ring portion of the valve body is constructed as a separate annular ring member thereby allowing the snap ring engaging retainer flange to be of minimum diameter and thereby reducing the overall spacing requirements for the control valve within the control unit.

The invention further contemplates a solenoid actuated hydraulic control valve as above described wherein the separate annular flux ring is constructed in sub-combination with the casing and coil of an associated electronic control module thereby allowing the sub-assembly to be fitted over the solenoid sleeve of each control valve and onto a reduced diameter portion of the valve body as part of the final assembly of the control unit.

The invention further contemplates a control valve for a vehicle anti-lock brake system control unit having a control valve bore, wherein the control valve comprises a sleeve having a moveable armature therein, a coil surrounding the sleeve for moving the armature, the coil having an inner diameter and an outer diameter, and a valve body having an inner and an outer end, the outer end attached to the sleeve and the inner end seated within the control valve bore of the housing, the valve body having an outer diameter no greater than the outer diameter of the coil such that minimum spacing between multiple control valves in the control unit is not limited by the outer diameter of the valve body.

The invention also contemplates a vehicle anti-lock control unit including a valve body housing having a plurality of solenoid activated hydraulic control valves received therein, and an electric control module fitted and secured to the housing and having integrated therein the casing and coil components of the control solenoids, and preferably including a separate flux ring secured to each respective casing to thereby retain the coil and allow the respective casing/coil/flux ring subunits to be slidably received over a reduced diameter outer portion of the valve body.

These and other objects and advantages will be readily apparent upon consideration of the following description and drawings.

BEST MODE FOR CARRYING OUT THE INVENTION

Figure 1:
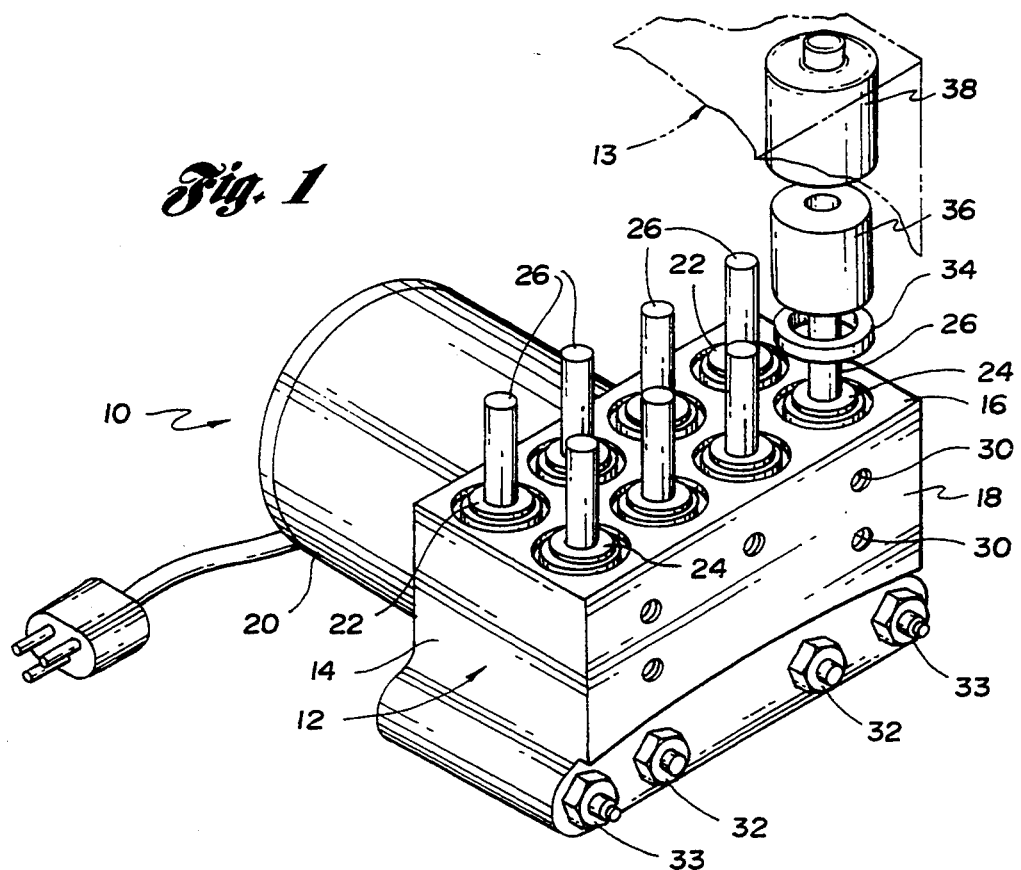
FIG. 1 is an overall exploded perspective view partially in cross-section showing a hydraulic control unit and associated electronic control module as constructed in accordance with the present invention.

Referring now to FIG. 1, an hydraulic control unit constructed in accordance with the present invention is shown, designated generally by reference numeral 10. The control unit (10) includes a valve body housing generally designated (12) having a plurality of walls (14,16,18). It also includes an electrical control module (or CIM) generally designated (13) to be secured to the housing (12) in final assembly.

Extending from one wall (14) of the housing (12) is an electrically driven pump (20), for providing supplemental brake pressure to the wheels during controlled braking. Extending from another wall (16) is a plurality of solenoid actuated isolation valves (22) and hold/dump valves (24), generally one each for each wheel of the vehicle, and each aligned along a respective axis A,B for controlling the brake fluid pressure applied to each wheel brake. As shown in the drawing, only a solenoid sleeve (26) and a portion of the valve body (28) of each solenoid actuated isolation valve (22) and hold/dump valve (24) are visible. Each sleeve (26) is in axial alignment with the remainder of the associated valve located within the housing (12).

Extending from yet another wall (18) of the housing (12) is a plurality of brake lines (30) for transmitting brake fluid in the hydraulic brake circuitry. Brake lines (30) lead to either the slave brake cylinders (not shown) of each wheel or the master brake cylinder (not shown). Extending from this same wall (18) are several low pressure accumulators (32) and pilot valves (33), the function of each being well known in ABS systems.

FIG. 1 also shows a plurality of flux rings (34), coils (36), casings (38), molded within the electrical control module (13). The control module (13) is adapted to receive the casings (38), which in turn are adapted to receive the coils (36) and flux rings (34). The flux rings (34), coils (36), casings (38) and control module (13) together form a sub-assembly for placement over the respective sleeves (26) of the solenoid actuated isolation valves (22) and hold/dump valves (24) after the isolation and hold/dump valves (22,24) have been installed in the housing (12) of the control unit.

Figures 2, 3:
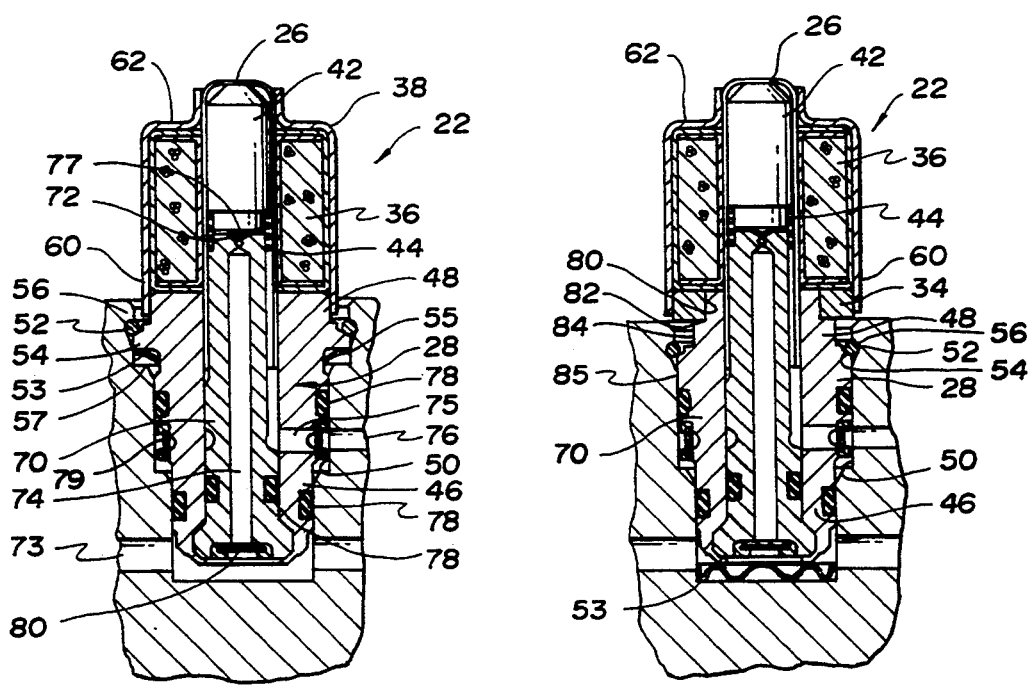
FIG. 2 is an exploded elevation view in full cross-section showing a hydraulic control unit and associated control valve as constructed in accordance with a first embodiment of the present invention.
FIG. 3 is an exploded elevation view in full cross-section showing a hydraulic control unit and associated solenoid actuated hydraulic control valve as constructed in accordance with a second embodiment of the present invention.

Referring now to FIG. 2, a first embodiment of a control valve of the present invention is shown. The control valve depicted in FIG. 2 is a solenoid actuated isolation valve (22). It should be noted, however, that the various embodiments of the present invention as described below are equally applicable to the solenoid actuated hold/dump valves (24) discussed above.

In this embodiment, the normally open isolation valve (22) comprises a cylindrical sleeve (26) having a movable armature (42) slidably received therein. The control valve (22) further comprises an annular coil (36) surrounding the sleeve (26). As is well known in the art, the coil (36) is energized with an electric current, which in turn sets up a magnetic field for moving the armature (42) against a biasing spring (44), closing off fluid flow through passages (73-76) by seating the integral armature ball valve (77) onto the valve seat (72) of valve stem (70) at the end of flow passage (74).

The isolation valve (22) further comprises a valve body (28) having an inner end (46) and outer end (48). The outer end (48) of the valve body (28) is attached to the sleeve (26), while the inner end (46) of the valve body (28) is seated within a bore (50) formed in the valve body housing (12). The outer end (48) of the valve body (28) is preferably attached to the sleeve (26) by a brazing process, but other conventional forms of attachment may also be used.

The isolation valve (22) of this embodiment further comprises a snap ring (52) for securing the inner end (46) of the valve body (28) within the bore (50) of the housing (12). Snap ring (52) is preferably an annular ring having a circular cross-section. As seen in FIG. 2, the valve body (28) and the bore (50) each include a retaining flange (54,56) in the form of a shoulder formed therein. The respective retaining flanges (54,56) of the valve body (28) and the bore (50) are reciprocal and cooperate to receive the snap ring (52). A wave washer (53) seated within counterbore (55) on shoulder (57) serves to bias the retaining flange (54) against the snap ring.

Flow is restricted to flow passages (73-76) by O-ring seals (78). Annular filter (79) and disc-type filter (80) assist in precluding the possibility of particulates appearing in flow passages (74) and (75).

The isolation valve (22) further comprises a casing (38) having an open end (60) and a substantially closed end (62). The open end (60) of the casing (38) is adapted to receive the coil (36) and is attached to the outer end (48) of the valve body (28). As shown in FIG. 2, such attachment is preferably a slip fit. This arrangement, as with the embodiment of FIG. 3, allows that the casing (38) may be integrated with the coil integrated module (CIM) or electric control module (13) (FIG. 1), i.e. molded in place as a single unit. Thereafter, as a final assembly step the CIM (13) is fitted onto control unit housing (12) with each of the respective casing/coil units being slidably received over the respective sleeves (26) and with the casing (38) making sliding contact at its open end with the respective control valve body (28).

Another construction, this one being known to the art, is to provide the outer end (48) of the valve body (28) with an annular groove (not shown) into which the open end (60) of the casing (38) may be crimped. With either arrangement, the casing (38) serves to secure the coil (36) about the sleeve (26). To enhance the magnetic field set up by the electrically energized coil (36), the casing (38) and valve body (28) are preferably constructed from a ferrous material, such as steel.

Referring now to FIG. 3, a second embodiment of a control valve of the present invention is shown. In this embodiment, the isolation valve (22) once again comprises a sleeve (26) having a movable armature (42) therein, an electrically energizable coil (36) surrounding the sleeve (26) for moving the armature (42) against a biasing spring (44), and a valve body (28) having an inner end (46) and outer end (48).

The inner end (46) of the valve body (28) is again seated within a control valve bore (50) formed in the valve body housing (12), while the outer end (48) is again attached to the sleeve (26). However, the valve body (28) of this embodiment has a smaller outer diameter relative to that of the valve body (28) of the embodiment shown in FIG. 2. More specifically, the valve body (28) of this embodiment has an outer diameter less than or equal to the outer diameter of the coil (36). As will be explained in greater detail below, this reduced outer diameter valve body (28) contributes to an overall reduction in size of the control unit (10).

The isolation valve (22) of this embodiment once again includes a snap ring (52) for securing the inner end (46) of the valve body (28) within the bore (50) of the housing (12). However, since the outer diameter of the valve body (28) has been reduced in this embodiment, the diameters of the bore (50) and snap ring (52) are likewise reduced. Moreover, the valve body (28) and the bore (50) again each include a retaining flange (54, 56) in the form of a shoulder formed therein. The respective retaining flanges (54, 56) of the valve body (28) and the bore (50) are reciprocal and cooperate to receive the snap ring (52). A wave washer (53) seated at the bottom of the main bore of the housing and bearing against the head of the valve stem (70) serves to bias the valve against the snap ring (52).

Still referring to FIG. 3, this isolation valve (22) once again comprises a casing (38) having an open end (60) and a substantially closed end (62). In this embodiment, however, the outer diameter of the outer end (48) of the valve body (28) is reduced relative to the outer diameter of the remainder of the valve body (28). This reduced diameter portion is shown as annular land (80). The land (80) terminates at a radial shoulder (82) which terminates at a second annular land (84), the diameter of which is less than the maximum diameter portion (85) of the lower end (46) of the valve body (28). Thus, in this embodiment, the retaining flange (54) is formed at the junction of the reduced diameter portion constituting second annular land (84) with the outer extremities of the lower end of the valve body. This is in contrast to the embodiment of FIG. 2 wherein the retaining flange 54 radially extends beyond the maximum diameter of the valve body lower end (46) and thus requires a substantially enlarged counterbore (55) to secure the valve into the control unit.

A separate flux ring (34) is provided having an inner diameter sized to be slidably received onto the reduced diameter portion (82) of the outer end (48) of the valve body (28). The flux ring rests on shoulder (82). It is separately installed onto the valve body once the valve body is secured in place via snap-ring (52) within the housing (12). Preferably, the casing (38), coil (36) and the flux ring (34) will be constructed as a single unit and integrated with the CIM, as with the embodiment of FIG. 2. For example, the flux ring (34) may be held to the casing by crimping as described earlier. In such a fashion, the coil (36) is held within the casing (38) between the substantially closed end (62) of the casing (38) and the flux ring (34), and as in the previous embodiment, the casing (38) (and coil 36 and flux ring 34) may be slip-fitted onto the sleeve (26).

Alternatively, the flux ring (34) can remain a separate part to be slip-fitted (or secured) onto the control valve (28) following securement of the control valve into the housing (12), with the casing/coil unit thereafter being slip-fitted onto the sleeve (26) and flux ring. To allow this construction it will be noted from FIG. 3 that the outer diameter of the flux ring (34) is no greater than the outer diameter of the coil (36) and inner diameter of the casing (38) at its open end (60).

Once again, to enhance the magnetic field set up by the electrically energized coil (36), the flux ring (34), casing (38) and valve body (28) are preferably constructed from a ferrous material, such as steel.

As previously described, the flux ring (34), coil (36), and casing (38) preferably form a subassembly with the electrical control module (40) (see FIG. 1) for placement over the sleeve (26) of the isolation valve (22). The construction of such a subassembly is facilitated by the use of the flux ring (34) which, as also previously described, serves to hold the coil (36) within the casing (38). Additional design details of the control valve and its operation may be found in U.S. Pat. No. 4,828,335, assigned to the assignee of the present invention, which is incorporated herein by reference for such further description.

Figure 4:
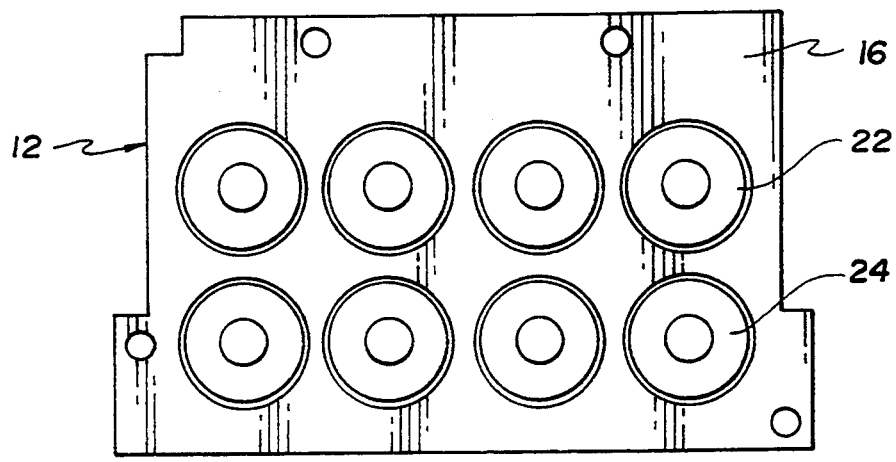
FIGS. 4 and 5 are plan views of a hydraulic control unit with associated control valves as constructed in accordance with the prior art and with the present invention, respectively, thus providing a visual comparison of the dramatic reduction in overall size of the hydraulic control unit as constructed in accordance with the present invention.
Figure 5:
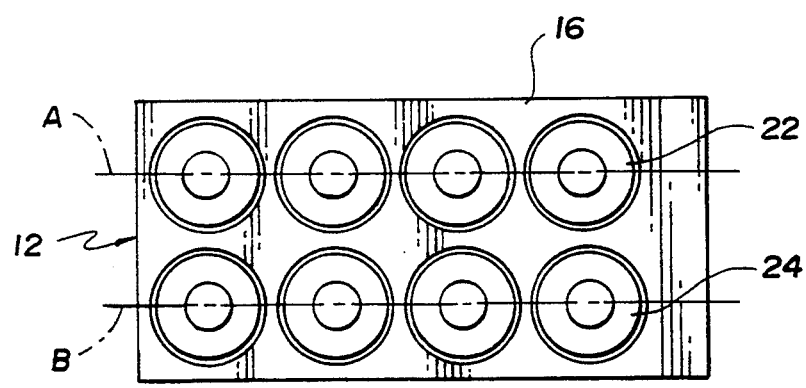

Referring now to FIGS. 4 and 5, the respective plan views show a valve body housing (12) with associated isolation valves (22) and hold/dump valves (24) as constructed in accordance with the prior art and present invention, as constructed in the embodiment of FIG. 3. These Figures thus provide a visual comparison of the dramatic reduction in overall size of the hydraulic control unit (10) as constructed in accordance with the second embodiment of the present invention. In one specific application, the surface area of the control unit wall (16) depicted in FIG. 5 was reduced 22% from 11.1 square inches to 8.7 square inches, with each unit including four isolation valves (22) and four hold/dump valves (24). Each of the valves (22),(24) are received within a respective bore, the center lines of which are aligned along a common axis A,B, respectively, extending across the common wall shown.

The embodiment of FIG. 2 offers less advantage in reducing the overall size of the control unit, and in some cases may offer no size advantage dependent upon the manner in which the prior art devices are to be secured within the housing.

As seen in FIG. 5, the previously described reductions in the diameters of the valve body (28), bore (50), and snap ring (52) allow multiple solenoid actuated control valves (22),(24) to be spaced closer together in the valve body housing (12) of the control unit (10). More particularly, by limiting the outer diameter of each valve body (28) to a size no greater than the outer diameter of the coils (36), the spacing of multiple valves (22),(24) in the housing (12) is no longer limited by the outside diameter of the valve bodies (28).

Instead, the spacing of multiple control valves (22),(24) in the housing (12) is now limited by the outside diameter of the coils (36) or, more particularly, by the outside diameter of the casings (38), as well as the physical properties of the material, typically aluminum, chosen for the valve body housing (12) of the control unit (10). The present invention thus provides a control valve for a vehicle anti-lock brake control unit (10) that can be installed in the control unit housing (12) occupying a minimum surface area on the wall (16) of the housing (12) from which the control valves (22),(24) extend, thereby minimizing the overall size of the control unit (10).

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A control valve for a vehicle anti-lock brake system control unit having a housing with a control valve bore therein, the control valve comprising:
    a sleeve having a moveable armature therein;
    a coil surrounding the sleeve for moving the armature, the coil having an inner diameter and an outer diameter;
    a valve body having an inner and an outer end, the outer end attached to the sleeve and the inner end seated within the control valve bore of the housing, the valve body having an outer diameter no greater than the outer diameter of the coil;
    a flux ring surrounding the outer end of the valve body;
    a casing for securing the coil about the sleeve, the casing attached to the flux ring;
    the outer diameter of the valve body being reduced at the outer end of the valve body, the outer end of the valve body adapted to receive the flux ring, the flux ring having an outer diameter no greater than the outer diameter of the coil;
    an electrical control module attached to the coil, the control module, casing, coil and flux ring together forming a sub-assembly, the sub-assembly being placed over the sleeve and the outer end of the valve body after the inner end of the valve body is seated within the control valve bore of the housing.

2. The control valve of claim 1 further comprising a snap ring for securing the inner end of the valve body within the control valve bore of the housing.

3. The control valve of claim 2 wherein the valve body and the control valve bore of the housing each include a retaining flange, the respective retaining flanges cooperating to receive the snap ring.

4. The control valve of claim 3 wherein the casing, flux ring and valve body are constructed from a ferrous material.

5. A vehicle anti-lock brake control unit comprising a housing having a plurality of solenoid actuated hydraulic control valves non-threadedly secured in relative fixed axial position within a respective control valve bore therein and extending from a common wall of the housing;
    each control valve including a valve body, a valve stem concentrically aligned with the valve body and non-threadedly secured thereto in fixed relative axial position, said valve stem including an axially extending flow passage therethrough open at each end thereof, an armature concentrically aligned with said valve stem and operatively coupled with said valve stem to close said flow passage when activated by a coil, and a cylindrical sleeve surrounding said armature and secured to said valve body;
    said sleeve and enclosed armature projecting beyond said housing common wall;
    said control unit further including an electrical control module including a plurality of individual cylindrical coils received within a respective annular metal casing; and
    said coils being slidably received over respective control valve sleeves, and said casing being slidably received over a portion of each respective valve body and in loose contact therewith, whereby the electrical control module may be connected and disconnected as a unit from the housing.

6. The anti-lock brake control unit of claim 5 wherein each said valve body includes an outer diameter no greater than the outer diameter of the coil.

7. The anti-lock brake control unit of claim 5 wherein each said valve body includes an inner end seated within said control valve bore and an outer end projecting beyond said common wall of the housing; and
    a flux ring slidably received upon said outer end and being received within said casing.

8. The anti-lock brake control unit of claim 7 wherein said flux ring is secured to the casing to provide a single subunit of casing, coil and flux ring to be fitted over the sleeve.

9. The anti-lock brake control unit of claim 7 wherein the outer diameter of the valve body is reduced at the outer end of the valve body, the outer end of the valve body adapted to receive the flux ring, the flux ring having an outer diameter no greater than the outer diameter of the coil.

10. The anti-lock brake control unit of claim 9 wherein the maximum outer diameter of the valve body is no greater than the outer diameter of the flux ring, coil and casing.

11. The anti-lock brake control unit of claim 10 further comprising a snap ring for securing the inner end of the valve body within the control valve bore of the housing.

12. The anti-lock brake control unit of claim 11 wherein the valve body and the control valve bore of the housing each include a retaining flange, the respective retaining flanges cooperating to receive the snap ring.

13. The anti-lock brake control unit of claim 12 wherein the casing, flux ring and valve body are constructed from a ferrous material.

14. The anti-lock brake control unit of claim 5 further comprising a snap ring for securing the inner end of the valve body within the control valve bore of the housing.

15. The anti-lock brake control unit of claim 4 wherein the valve body and the control valve bore of the housing each include a retaining flange, the respective retaining flanges cooperating to receive the snap ring.

* * * * *

UNITED STATES PATENT AND TRADEMARK OFFICE
CERTIFICATE OF CORRECTION

PATENT NO. : 5,439,279
DATED : August 8, 1995
INVENTOR(S) : Linkner, Jr., et al.

It is certified that error appears in the above-indentified patent and that said Letters Patent is hereby corrected as shown below:

Column 8, line 62, claim 15, after "claim" delete "4" and insert --14--.

Signed and Sealed this

Thirty-first Day of October 1995

Attest:

BRUCE LEHMAN

*Attesting Officer*     *Commissioner of Patents and Trademarks*